3,384,110
HIGH AND LOW PRESSURE CUTOFF PRESSURE REGULATOR
Donald C. Wiley, 938 Rydal Road,
Jenkintown, Pa. 19046
Filed Sept. 20, 1965, Ser. No. 488,458
9 Claims. (Cl. 137—458)

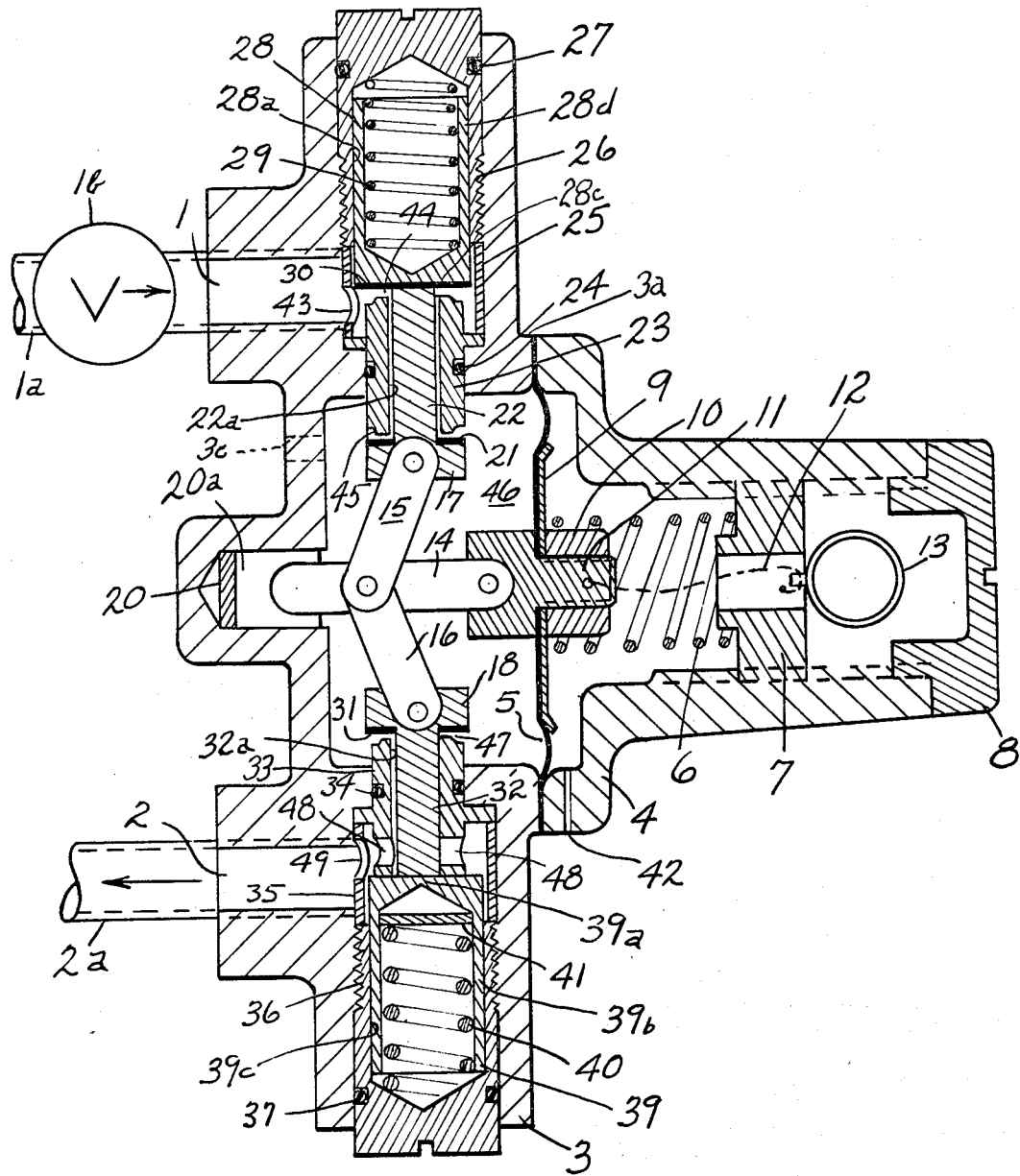

ABSTRACT OF THE DISCLOSURE

A fluid pressure regulator having inlet and outlet valves and outlet pressure responsive mechanism for exerting a force to open and close both valves, and means biasing the outlet valve open with a force equal to the valve closing force developed by the pressure responsive mechanism under excessive outlet pressure so both the inlet and outlet valves are closed under such conditions.

---

This invention is a fluid pressure regulator with automatic shut-off in case of excess flow, over or under pressure, or failure of the control springs, diaphragm, or control valve seat. Features include damping to reduce the effect of transient pulsations in pressure.

In the drawing, the single figure is a section through a preferred form of regulator for use in centralized fuel oil distribution.

The regulator has a fuel oil inlet 1 at the top for connection to an incoming fuel line 1a containing the usual manual shut-off valve 1b and an outlet 2 at the bottom for connection to a line 2a leading to the appliances to be served. Both the inlet and outlet are preferably part of a die cast control chamber 3 having an open side 3a to which is bolted a die cast range spring housing 4. A pressure regulating diaphragm 5 of oil resistant material clamped between the housings 3 and 4 closes the side 3a. The diaphragm is loaded by a range spring 6 having its force controlled by a screw 7 which adjusts the control chamber pressure. The outer end of the range spring housing 4 is sealed by a cap 8. A suitable gage connection 3c is provided in the housing 3.

At the center of the diaphragm 5 is a metal plate 9 clamped between a slotted nut 10 and the head of a bolt 11. Attached to the bolt 11 is a flexible chain 12 having a pull ring 13 by which the diaphragm 5 may be pulled to the right against the force of the range spring 6. On the side of the diaphragm opposite the range spring is a link 14 pivoted at one end to the head of the bolt 11 and pivoted adjacent its other end to toggle links 15 and 16 pivoted respectively to inlet and outlet valve members 17 and 18. The link 14 rides in an insert 20 having a slot 20a complementary to the link which constrains the link to move in the plane of the drawing.

Inlet valve member 17 has a soft oil resistant seat 21 and a triangular or other non-circular push rod 22 which rides in a round hole 22a in inlet valve body 23. The valve is sealed to the casing by an O-ring 24 and is clamped in the casing by a sleeve 25 and a screw threaded plug 26 which is itself sealed in the casing by an O ring 27. The plug has a counterbore 28a for a cup-shaped plunger 28 having its bottom 28c abutting the push rod 22 and its sides 28d extending toward the bottom of the counterbore 28a. Between the bottom of the counterbore 28a and the bottom of the plunger 28 is a light compression spring 29. On the outside of the bottom of the plunger 28 is a soft oil resistant valve seat 30.

Outlet valve member 18 has a soft oil resistant seat 31 and is fixed to a triangular or other non-circular push rod 32 which rides in a round hole 32a in outlet valve body 33. The valve body is sealed by an O-ring 34 and is clamped in the housing 3 by a sleeve 35 and screw threaded plug 36. The plug is sealed in the housing by an O-ring 37. Inside the plug 36 is a cup-shaped plunger 39 having its bottom 39a abutting the push rod 32 and having its side walls 39b slidably received in a counterbore 39c in the plug 36. Between the bottom of the counterbore 39c and the bottom 39a of the plunger 39 is a stiff coil spring 40. Some adjustment of the bias pressure exerted by the spring 40 is obtained by choice of the thickness of shim 41.

Under normal operation, fuel oil enters through inlet connection 1 at high pressure, e.g., three to fifty or more pounds per square inch, and flows through port 43 in sleeve 25 and then between valve seats 30 and 44 respectively on the plunger 28 and inlet valve body 23. In normal operation, the seats 30 and 44 are separated and offer negligible resistance to the flow. The oil flowing between the seats 30 and 44 flows through the space between the push rod 22 and the bore 22a and then through the space between valve seat 21 on valve member 17 and valve seat 45 on valve body 23 into the control pressure chamber 46. The pressure in chamber 46 acts on the diaphragm in opposition to the force of range spring 6 so the position of the diaphragm and hence the position of the inlet valve member 17 is under normal conditions controlled to maintain the desired pressure in chamber 46, e.g., three pounds per square inch. During this normal operation, the outlet valve member 18 is held wide open by the stiff spring 40 so the valve seat 31 is widely separated from the valve seat 47 on the outlet valve member 33. The fluid within the control pressure chamber 46 flows through the space between the push rod 32 and the bore in the outlet valve body 33 and through ports 48 and 49 to the outlet 2. Normal changes in the outlet pressure act on the diaphragm 5 to cause opening and closing of the inlet valve member 17 to compensate for the pressure variations and maintain the outlet pressure at the desired level.

There are several conditions under which it is desirable that the incoming fluid be shut off. First, the diaphragm 5 may develop a leak, in which case the liquid from chamber 46 will leak through the diaphragm into the range spring housing 4 and equalize the fluid pressure across the diaphragm. A bleed hole 42 of small diameter (approximately .010 inch) prevents any appreciable leakage of liquid from the range spring housing under these conditions. The range spring 6 accordingly moves the diaphragm 5 to the extreme left, causing the inlet valve member 17 to move to a wide open position with respect to the valve seat 45 and permitting closure of the plunger 28 by spring 29 against the seat 44 to shut off the incoming liquid.

A second condition requiring shut-off of the incoming fuel oil is a break in the fuel outlet line 2a. The excess flow through the break causes a drop in pressure in the chamber 46 and a movement of the diaphragm to the left under the range spring 6. As the diaphragm moves to the left, the inlet valve member 17 moves downward, moving the seat 21 away from the seat 45 and moving the push rod 22 away from the valve plunger 28. Under this condition, the spring 29 causes the plunger 28 to follow the push rod 22 downward and in so doing, tends to close the seat 30 against the seat 44 and restrict the incoming fluid. This restriction results in a further drop in pressure in the chamber 46 and causes the diaphragm 5 to move further to the left until the seat 30 is fully closed against the seat 44 and the flow of fluid completely shut off. The pressure in chamber 46 then drops essentially to atmospheric pressure and the diaphragm 5 remains biased to its extreme left position by the range spring 6.

Under either of these conditions, the flow of fluid remains shut off until the regulator is reset. This is accomplished by removing the closure 8 and pulling the ring 13 to move the diaphragm to the right against the force of the range spring 6. Removal of the closure 8 will disclose to the service man whether the shut-off has been due to a leak in the diaphragm or a break in the fuel line. In either case, correction of the cause of shut-off is necessary before the regulator can be reset. If the diaphragm leak is not sealed or if the outlet line break is not repaired, pulling the ring 13 to reposition the diaphragm will start the flow of fluid, but as soon as the ring 13 is released the fluid flow will be shut off because the cause of shut-off has not been corrected.

A third condition under which the incoming fuel oil should be sut off is under excessively high outlet pressure such as would be caused by leakage between the valve seats 21 and 45. This leakage might be caused by damage to the seats or by dirt between the seats preventing closure. Under these conditions, the pressure in chamber 45 rises and at a predetermined pressure, e.g. 6 p.s.i., overcomes the range spring 6 and moves the diaphragm 5 to the right. The toggled links 15, 16 under thise condition overcome the stiff spring 40 and close the seat 31 on outlet valve 18 against seat 47, thereby shutting off the flow to the outlet. As soon as the outlet flow is shut off, the pressure in chamber 46 builds up equal to the pressure in inlet supply line 1a. At shut-off, the toggle links 15 and 16 are stopped short of dead center so the full pressure is available to hold the valve 18 closed. If the toggle links went past dead center on over pressure shut-off, the outlet valve 18 would open. In order to restore the regulator to normal operation, it is necessary to shut off the valve 1b, remove and repair the regulator, replace the repaired regulator, open the valve 1b, remove cap 8 and pull the ring 13 to reset the regulator and start the flow.

When the appliance served by the regulator is shut off, the flow drops to zero and it is normal for the control pressure to increase up to 150% above the set or normal control pressure. This increase or over shoot should not cause shut-off. Such unwanted shut-off is prevented by the preload or bias of the outlet valve spring 40. When the regulator is set to control the pressure at three pounds per square inch, an increase to four or even five pounds per square inch will not start to close the over pressure shut-off valve. The over pressure shut-off starts at about six pounds per square inch or of the order of double the nominal control pressure and is tightly closed at the eight pounds per square inch limit required by National Fire Protection Association Standard 31 section 3813. The present regulator meets the requirements of sections 3811, 3812 as well as 3813.

Both plungers 28 and 39 have a sliding fit in the plugs 26 and 36 respectively and there is, accordingly, a dash pot effect of liquid between the plunger and the associated plug which causes relatively slow movement of the plungers so that transient changes in pressure which could cause a response of the sensitive diaphragm 5 are effectively damped and will not cause a regulator shut-off. It would be a nuisance if the safety shut-off operated under transient conditions. For example, in a heating oil system, sudden increases in demand for heat call for increased flow and opening of the inlet valve 17. The lost motion connection between the inlet valve and the plunger 28 allows this to take place without compelling corresponding motion of the plunger which might trigger a shut-off. Note the damping of the plunger 28 does not interfere with the sensitivity of the regulator.

If the spring 29 should fail, the weight of the plunger 28 is adequate to close the seat 30 against the seat 44 and shut off the incoming liquid upon low output pressure. Failure of the spring 40 merely results in a shut-off at a lower pressure. In case of excessively low or high pressures, the regulator fails safe.

What is claimed as new is:

1. In a fluid pressure regulator, a control pressure chamber having inlet and outlet valves, a flexible diaphragm responsive to the control pressure, mechanism operated by the diaphragm for exerting closing and opening forces respectively on both the inlet and outlet valves as the control pressure rises and falls, means biasing the outlet valve member open with a force in excess of that exerted by the operating mechanism while the control pressure is at a predetermined pressure whereby at and below said predetermined pressure the mechanism opens and closes the inlet valve and upon control pressures of the order of double said predetermined pressure the mechanism overcomes the biasing means and closes the outlet valve.

2. In a fluid pressure regulator, a control pressure chamber having inlet and outlet valve seats, an inlet valve member associated with the inlet seat, an outlet valve member associated with the outlet valve seat, a flexible diaphragm responsive to the control pressure, mechanism operated by the diaphragm for exerting a force on the inlet and outlet valves in the direction to move the valves toward and away from the associated seats respectively as the control pressure rises and falls, means biasing the outlet valve member away from its seat with a force in excess of that exerted by the operating mechanism while the control pressure is at a predetermined pressure whereby at and below said predetermined pressure the mechanism moves the inlet valve and upon control pressures of the order of double said predetermined pressure the mechanism overcomes the biasing means and moves the outlet valve against its seat.

3. In a fluid pressure regulator, a control pressure chamber having inlet and outlet valve seats, an inlet valve member associated with the inlet seat, an outlet valve member associated with the outlet valve seat, a flexible diaphragm responsive to the control pressure, a toggle operated by the diaphragm and connected at one end to the inlet valve and at the other end to the outlet valve for exerting a force on the valves in the direction to move the valves toward and away from the associated seats respectively as the control pressure rises and falls, means biasing the outlet valve member away from its seat with a force in excess of that exerted by the operating mechanism while the control pressure is at a predetermined pressure whereby at and below said predetermined pressure the mechanism moves the inlet valve and upon control pressures of the order of double said predetermined pressure the mechanism overcomes the biasing means and moves the outlet valve against its seat.

4. The regulator of claim 3 in which the toggle is on one side of dead center at all pressures below and above said predetermined pressure.

5. The regulator of claim 3 in which the inlet and outlet valves are aligned and in opposed relation to each other.

6. The regulator of claim 1 having another inlet valve member and associated seat upstream of the first inlet valve seat and means for moving the other inlet valve member against its seat as the first inlet valve member moves a predetermined distance away from its seat.

7. In a fluid pressure regulator, a control pressure chamber having aligned inlet and outlet valve seats in opposed relation to each other, an inlet valve member associated with the inlet seat, an outlet valve member associated with the outlet valve seat, a flexible diaphragm responsive to the control pressure, mechanism operated by the diaphragm for exerting a force on the inlet and outlet valves in the direction to move the valves toward and away from the associated seats respectively as the control pressure rises and falls, a dashpot plunger and associated spring for each valve member biasing its valve member away from its seat, the force exerted by the plunger for the inlet valve member being less than that exerted by the operating mechanism and the force exerted by the plunger for the outlet valve being greater than that exerted by the operating mechanism while the control pressure is at a predetermined pressure whereby at and below said predetermined pressure the mechanism moves the inlet valve and upon control pressures substantially in excess of said predetermined pressure the mechanism overcomes the biasing means and moves the outlet valve against its seat.

8. The regulator of claim 7 having another inlet valve member and associated seat upstream of the first inlet valve seat, and means for moving the other inlet valve member against its seat as the first inlet valve member moves a predetermined distance away from its seat.

9. The regulator of claim 8 in which the other inlet valve member is the dashpot plunger for the first inlet valve member.

References Cited

UNITED STATES PATENTS

| | | | |
|---|---|---|---|
| 1,739,926 | 12/1929 | Stettner | 137—505.42 XR |
| 2,178,974 | 11/1939 | Smith | 137—505.42 XR |
| 2,800,918 | 7/1957 | Wright | 137—461 |
| 3,032,054 | 5/1962 | Irwin | 137—505.46 XR |

WILLIAM F. O'DEA, *Primary Examiner.*

H. W. WEAKLEY, *Assistant Examiner.*